(12) United States Patent
Finn et al.

(10) Patent No.: US 7,575,417 B2
(45) Date of Patent: Aug. 18, 2009

(54) REINFORCED FAN BLADE

(75) Inventors: Scott Roger Finn, Niskayuna, NY (US); Govindarajan Rengarajan, Latham, NY (US); David William Crall, Loveland, OH (US); Ian Francis Prentice, Cincinnati, OH (US)

(73) Assignee: General Electric Company, Niskayuna, NY (US)

( * ) Notice: Subject to any disclaimer, the term of this patent is extended or adjusted under 35 U.S.C. 154(b) by 1078 days.

(21) Appl. No.: 10/656,380

(22) Filed: Sep. 5, 2003

(65) Prior Publication Data

US 2005/0053466 A1     Mar. 10, 2005

(51) Int. Cl.
*F03B 3/12* (2006.01)
*D04H 1/00* (2006.01)

(52) U.S. Cl. .................................... 416/230; 428/292.1

(58) Field of Classification Search ............. 428/292.1; 416/230, 189, 190, 191, 229 A
See application file for complete search history.

(56) References Cited

U.S. PATENT DOCUMENTS

| | | | |
|---|---|---|---|
| 4,343,593 A | 8/1982 | Harris | 416/193 |
| 4,471,020 A | 9/1984 | McCarthy | 428/309.9 |
| 4,810,167 A | 3/1989 | Spoltman et al. | 416/229 |
| 4,971,641 A | 11/1990 | Nelson et al. | 156/64 |
| 5,013,216 A | 5/1991 | Bailey et al. | 416/230 |
| 5,018,271 A | 5/1991 | Bailey et al. | 416/230 |
| 5,049,036 A | 9/1991 | Bailey et al. | 416/230 |
| 5,299,914 A | 4/1994 | Schilling | 416/203 |
| 5,340,280 A | 8/1994 | Schilling | 416/229 |
| 5,375,978 A | 12/1994 | Evans et al. | 416/230 |
| 5,490,764 A | 2/1996 | Schilling | 416/239 |
| 5,580,217 A | 12/1996 | Richards et al. | 416/193 A |
| 5,628,622 A | 5/1997 | Thore et al. | 416/241 R |
| 5,634,771 A | 6/1997 | Howard et al. | 416/241 |
| 5,655,883 A | 8/1997 | Schilling | 416/229 A |
| 5,672,417 A | 9/1997 | Champenois et al. | 442/208 |
| 5,720,597 A | 2/1998 | Wang et al. | 416/229 A |
| 5,755,558 A | 5/1998 | Reinfelder et al. | |
| 5,785,498 A | 7/1998 | Quinn et al. | 416/224 |
| 5,843,354 A | 12/1998 | Evans et al. | 264/136 |
| 5,934,609 A * | 8/1999 | Kuklinski | 244/51 |
| 2003/0129061 A1 | 7/2003 | Finn et al. | |

FOREIGN PATENT DOCUMENTS

EP          0526057 A1      2/1993
GB          1324898 A       7/1973

* cited by examiner

*Primary Examiner*—D. Lawrence Tarazano
*Assistant Examiner*—Camie S Thompson
(74) *Attorney, Agent, or Firm*—Penny A. Clarke

(57) ABSTRACT

A fan blade including a plurality of fiber composite layers and at least one high elongation fiber composite strip joining one of the fiber composite layers at a joint. A method of making a fan blade includes joining a plurality of fiber composite layers and joining at least one high elongation fiber composite strip to one of the plurality of fiber composite layers. An end of the high elongation fiber composite strip meets an end of the fiber composite layer at a joint.

19 Claims, 6 Drawing Sheets

REINFORCED FAN BLADE

BACKGROUND OF THE INVENTION

The invention relates to fan blades and in particular to fan blades reinforced with a high elongation fiber composite.

Fan blades used in jet engine applications are susceptible to foreign object impact damage such as bird ingestion events. Blades made of graphite fiber reinforced composite material are attractive due to their high overall specific strength and stiffness. However, graphite composites are particularly prone to brittle fracture and delamination during foreign object impacts due to their low ductility. Blade leading edges, trailing edges, and tips are particularly sensitive because of the generally lower thickness in these areas and the well-known susceptibility of laminated composites to free edge delamination. In addition blade geometry and high rotational speeds relative to aircraft speeds cause ingested objects to strike the blade near the leading edge. The material near the suction and pressure surfaces of the composite are most prone to fracture due to the local bending deformations typically associated with such events.

Metallic guards bonded to the composite blade are known to provide impact damage protection. However, the high density of these materials limit their use. In addition, blades can be ruggedized by increasing the airfoil thickness either locally or over a wide area. Blade thickening results in an aerodynamic penalty as well as a weight penalty.

BRIEF DESCRIPTION OF THE INVENTION

An aspect of the invention is a fan blade comprising a plurality of fiber composite layers and at least one high elongation fiber composite strip joining one of said fiber composite layers at a joint.

Another aspect of the invention is a method of forming a fan blade. A method of making a fan blade includes joining a plurality of fiber composite layers and joining at least one high elongation fiber composite strip to one of the plurality of fiber composite layers. An end of the high elongation fiber composite strip meets an end of the fiber composite layer at a joint.

BRIEF DESCRIPTION OF THE DRAWINGS

Referring to the exemplary drawings wherein like elements are numbered alike in the several Figures.

DETAILED DESCRIPTION OF THE INVENTION

Embodiments of the invention relate to reinforced, fiber composite fan blades. Such fan blades may be used in a variety of applications including jet engines, turbines, etc. The fiber composite may be a material having any (metal or non-metal) fiber filament embedded in any (metal or non-metal) matrix binder. In one embodiment of the invention, the majority of the fan blade is a lay-up of discrete fiber composite laminations. In an exemplary embodiment, the fiber composite is comprised of graphite fiber filaments embedded in an epoxy (e.g., epoxy resin) matrix binder with the resulting composite layer having an elastic modulus of between 124,110 megapascals (MPa) and 165,480 megapascals (MPa) and tensile elongation of between 1.3% and 1.5%, both measured parallel to the fibers. Other choices for the matrix resin include, but are not limited to, bismaleimide, polyimide, polyetherimide, polyetheretherketone, poly(aryl sulfone), polyethersulfone and cyante ester and combinations thereof. In one embodiment the matrix binder includes toughening materials such as rubber particles.

The fiber composite fan blades are reinforced with a high elongation fiber composite. In one embodiment, the modulus of the high elongation fiber composite may range from about 13,790 MPa to about 96,530 MPa and is preferably from about 41,370 MPa to about 62,055 MPa. The tensile elongation of the high elongation fiber composite should be at least about 1.75%, and is preferably at least about 3%. Exemplary high elongation fiber composites include S-glass, aramid, extended-chain polyethylene, and poly(p-phenylenebenzobisoxazole) (PBO).

Figure 1:
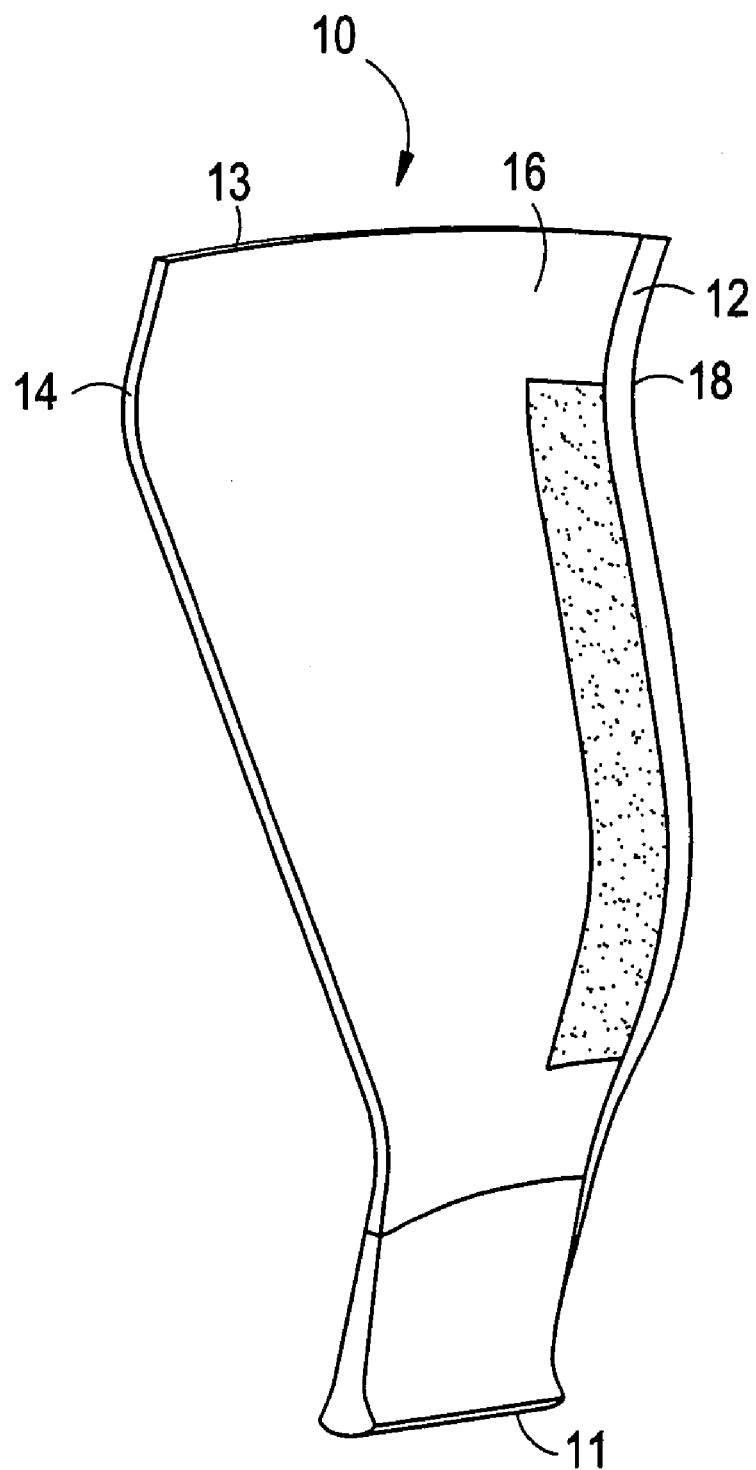
FIG. 1 is an exemplary fan blade.

FIG. 1 is a perspective view of a fan blade 10 in an embodiment of the invention. Fan blade 10 has a leading edge 12 and a trailing edge 14. The fan blade also has a first side 16 and a second side 18 that extend between the leading edge to the trailing edge. Additional components such as guards or coatings may be applied to the first and second side 16 and 18 as described in further detail with reference to FIG. 11. As known in the art, the majority of fan blade 10 is made from fiber composite layers (e.g., carbon fiber layers) extending between the leading edge 12 and the trailing edge 14. The fiber composite layers extend chordwise from leading edge 12 to trailing edge 14 and spanwise from a root 11 to a tip 13.

Fan blade 10 is reinforced with high elongation fiber composite strips in areas prone to damage. Typically these are blade leading edges, tips, and trailing edges and distributed toward the pressure and suction surfaces of the blade. The high elongation fiber composite strips allow fan blade 10 to deform greatly prior to failure and also results in the load being distributed over a larger area, making local damage less likely.

Figure 2:
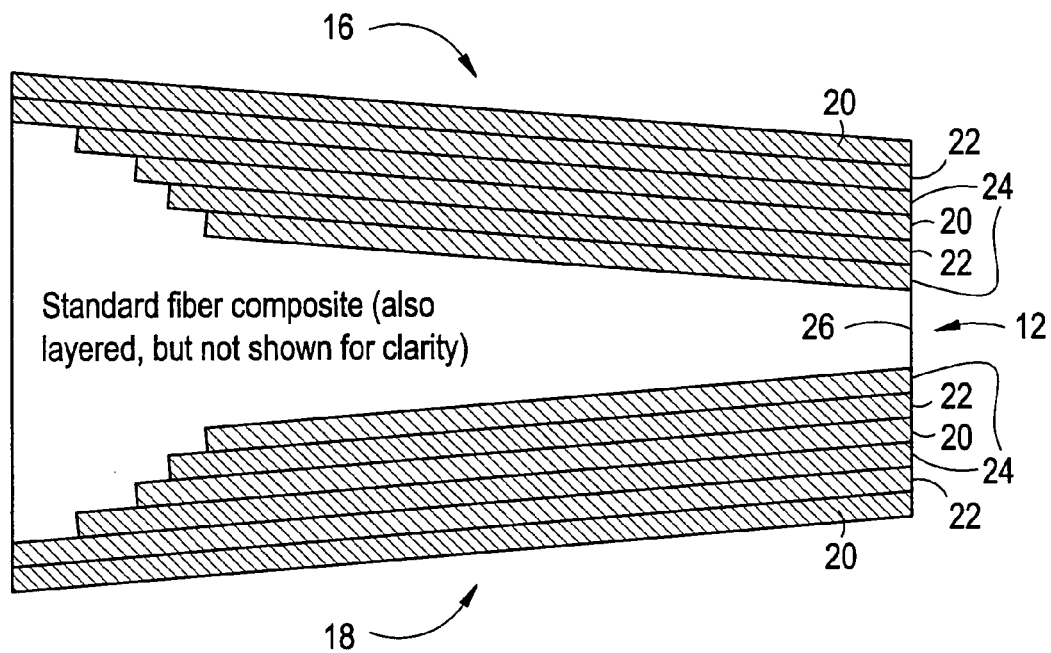
FIGS. 2 and 3 are cross-sectional views of a leading edge of a fan blade in an embodiment of the invention.

FIG. 2 is a cross-sectional view of a leading edge 12 of fan blade 10. A number of high elongation fiber composite strips 20, 22 and 24 are used to reinforce the leading edge. The strips extend from leading edge 12 towards trailing edge 14 and extend inward from the outer surfaces of sides 16 and 18. A section 26 of the composite fiber is left exposed at the leading edge 12. The high elongation fiber composite strips have fibers arranged in different orientations. High elongation fiber composite strips 20 have fibers oriented in a direction parallel to the spanwise direction of the blade 10. High elongation fiber composite strips 22 have fibers oriented in a direction 45 degrees relative to the spanwise direction of the blade 10. High elongation fiber composite strips 24 have fibers oriented in a direction −45 degrees relative to the spanwise direction of the blade 10.

Figure 3:
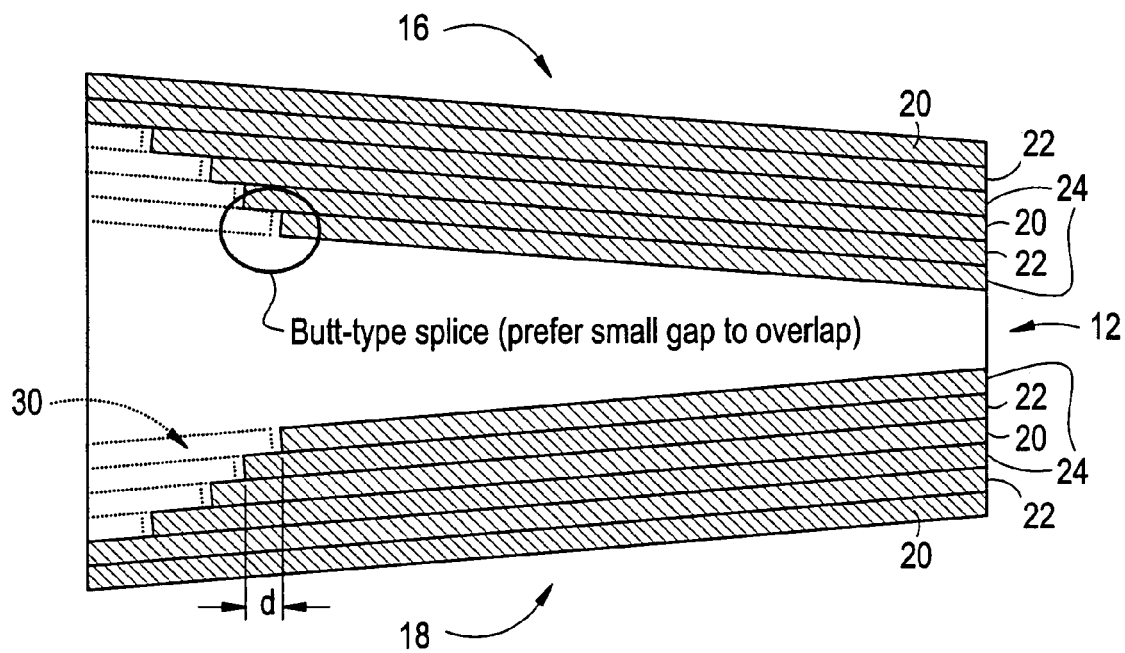

FIG. 3 shows fiber composite layers 30 relative to the high elongation fiber composite strips 20, 22 and 24. The ends of the high elongation fiber composite strips 20, 22 and 24 distanced from leading edge 12 are staggered. That is, the length of each high elongation fiber composite strips decreases as position from surface of sides 16 and 18 increases. In one embodiment, the difference d in length between adjacent high elongation fiber composite strips is at least about 0.1 inches. Alternatively, the difference d may be expressed as a function of strip thickness and in an embodiment, is at least 15 times the strip thickness. This tapers the high elongation fiber composite strips such that the compliant region is longer near the pressure and suction surfaces than in the middle of the fan blade.

The high elongation fiber composite strips 20, 22 and 24 meet the fiber composite layers 30 at a joint. The joint may be a butt joint or a small overlap. The high elongation fiber composite strips 20, 22 and 24 may be incorporated in blade 10 during the layup process in which layers of fiber composite and high elongation fiber composite are adhesively bonded or co-cured. The fan blade 10 is constructed from the interior outwards to the first side 16 and second side 18. The fiber composite layers 30 are joined using techniques such as adhesives or co-curing. Once the reinforcement locations are reached, strips of high elongation fiber composite are joined to the layers of fiber composite using techniques such as adhesives or co-curing.

Figure 4:
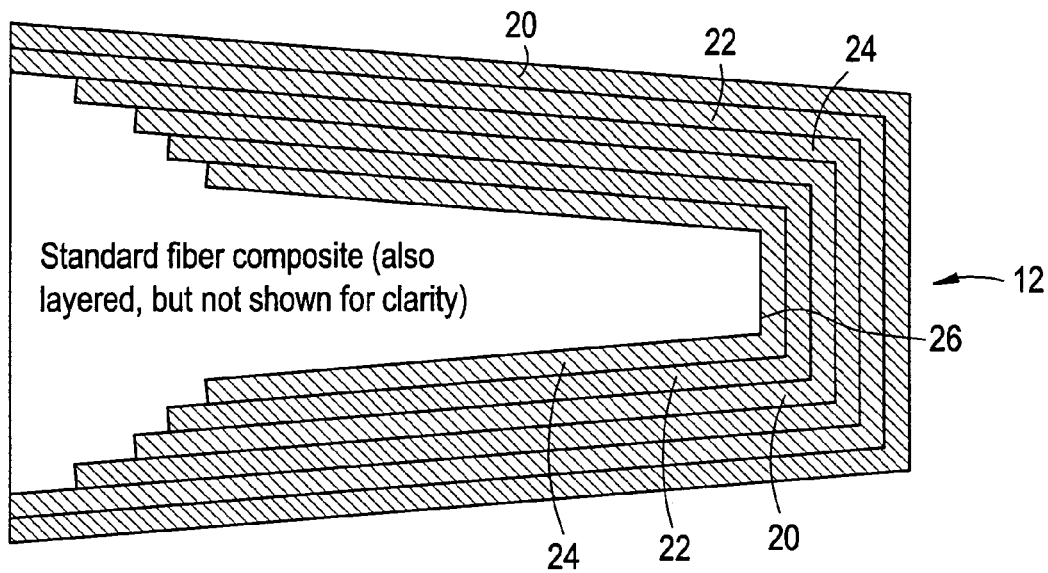
FIG. 4 is a cross-sectional view of a leading edge of a fan blade in another embodiment of the invention.

FIG. 4 is a cross-sectional view of a leading edge 12 of fan blade 10 in an alternate embodiment. In the embodiment of FIG. 4, the high elongation fiber composite strips 20, 22 and 24 wrap around leading edge 12 to cover the leading edge. High elongation fiber composite strips 20 have fibers oriented in a direction parallel to the spanwise direction of the blade 10. High elongation fiber composite strips 22 have fibers oriented in a direction 45 degrees relative to the spanwise direction of the blade 10. High elongation fiber composite strips 24 have fibers oriented in a direction −45 degrees relative to the spanwise direction of the blade 10. The high elongation fiber composite strips 20, 22 and 24 meet the fiber composite layers at a joint as described above with reference to FIG. 3.

Figure 5:
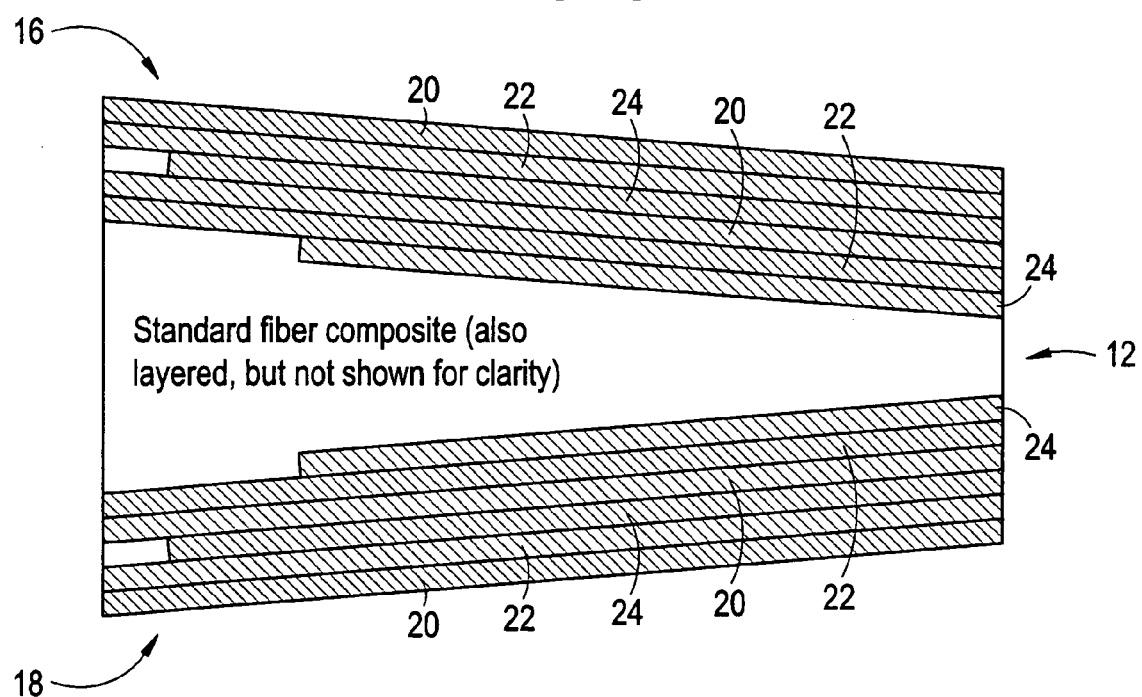
FIG. 5 is a cross-sectional view of a leading edge of a fan blade in another embodiment of the invention.

FIG. 5 is a cross-sectional view of a leading edge 12 of fan blade 10 in an alternate embodiment. In the embodiment of FIG. 5, the ends of the high elongation fiber composite strips 20, 22 and 24 are staggered such that adjacent high elongation fiber composite strips may have different lengths, but the lengths do not decrease as position from surface of sides 16 and 18 increases. High elongation fiber composite strips 20 have fibers oriented in a direction parallel to the spanwise direction of the blade 10. High elongation fiber composite strips 22 have fibers oriented in a direction 45 degrees relative to the spanwise direction of the blade 10. High elongation fiber composite strips 24 have fibers oriented in a direction −45 degrees relative to the spanwise direction of the blade 10. The high elongation fiber composite strips 20, 22 and 24 meet the fiber composite layers at a joint as described above with reference to FIG. 3.

Figure 6:
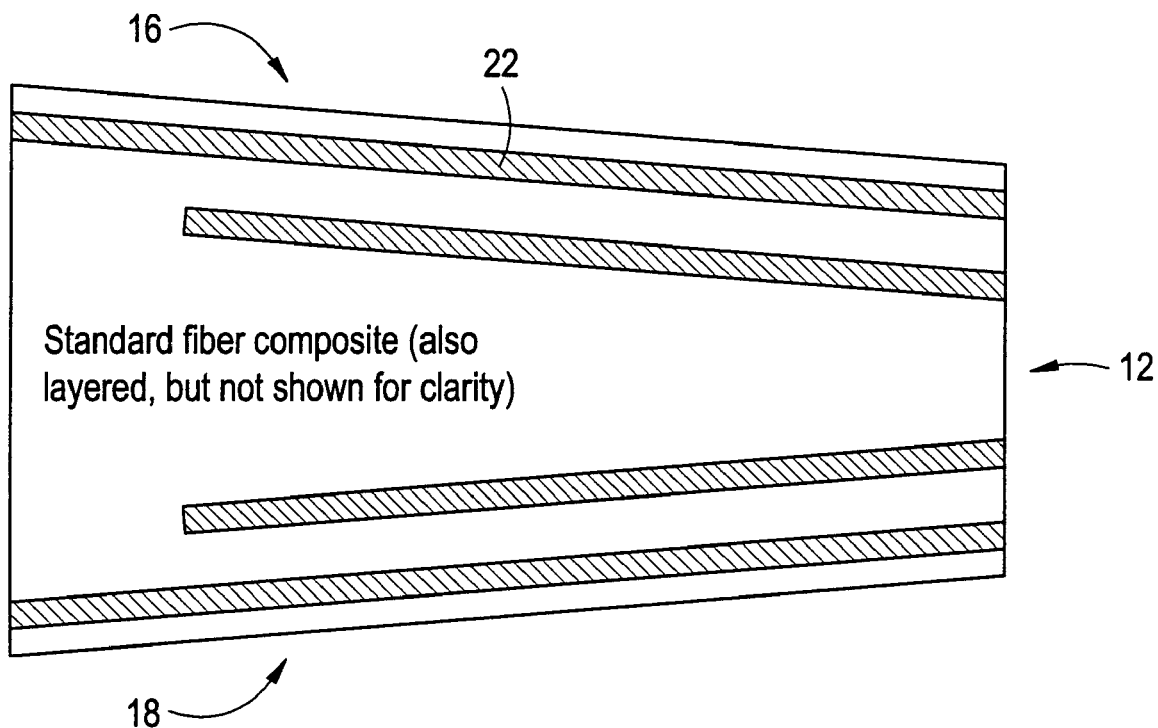
FIG. 6 is a cross-sectional view of a leading edge of a fan blade in another embodiment of the invention.

FIG. 6 is a cross-sectional view of a leading edge 12 of fan blade 10 in an alternate embodiment. The embodiment of FIG. 6 is similar to that in FIG. 5, but only selected fiber composite layers are replaced with high elongation fiber composite strips 22. Thus, a fiber composite layer is interposed between the high elongation fiber composite strips 22 rather than contiguous high elongation fiber composite strips of FIGS. 2-5. High elongation fiber composite strips 22 have fibers oriented in a direction 45 degrees relative to the spanwise direction of the blade 10. The high elongation fiber composite strips 22 meet the fiber composite layers at a joint as described above with reference to FIG. 3.

Figure 7:
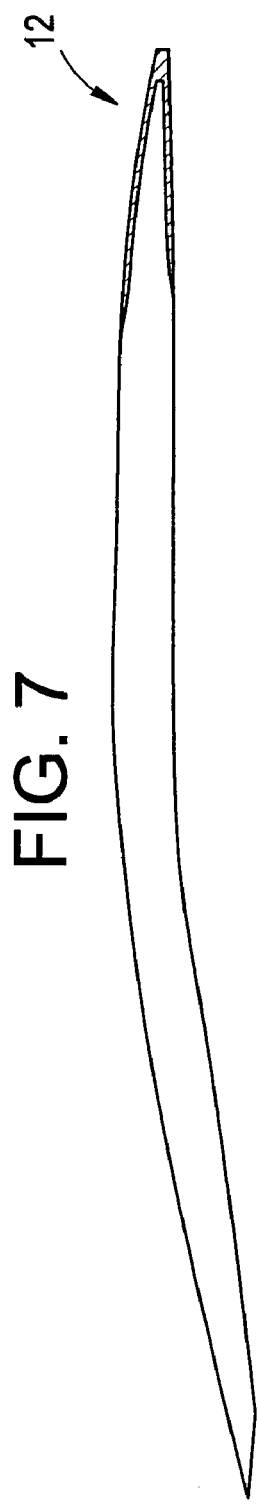
FIGS. 7-10 are cross-sectional views of fan blades depicting reinforcement placement in embodiments of the invention.
Figure 8:
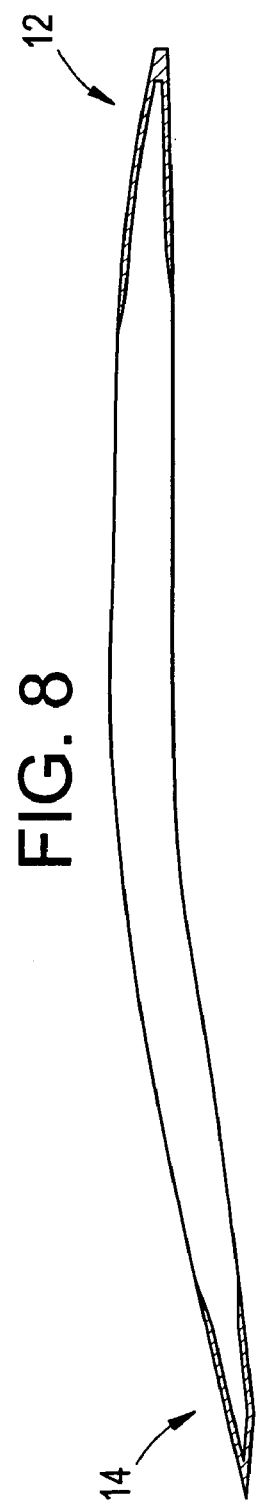
Figure 9:
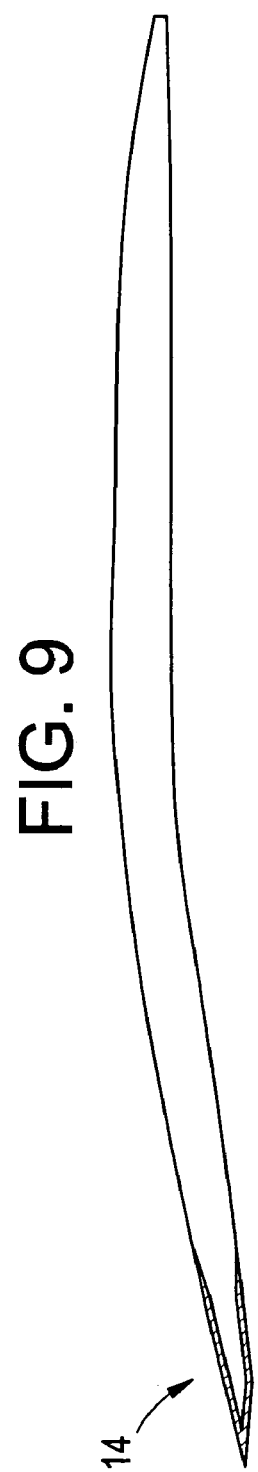
Figure 10:
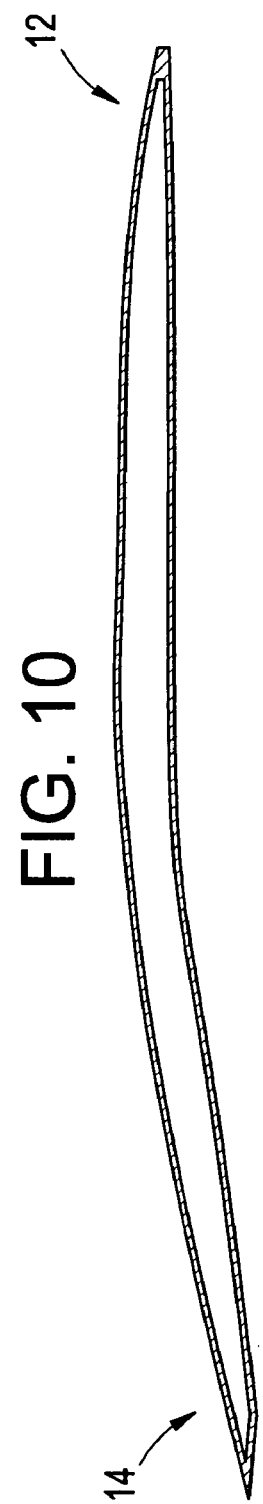

FIGS. 7-10 are cross-sectional views of fan blade 10 depicting different positions for the high elongation fiber composite strips. FIG. 7 depicts the high elongation fiber composite strips at the leading edge 12 of fan blade 10. FIG. 8 depicts the high elongation fiber composite strips at the leading edge 12 and trailing edge 14 of fan blade 10. FIG. 9 depicts the high elongation fiber composite strips at the trailing edge 14 of fan blade 10. FIG. 10 depicts the high elongation fiber composite strips across the entire surface of fan blade 10. The thickness of the high elongation fiber composite strips may vary over the surface of the fan blade.

Figure 11:
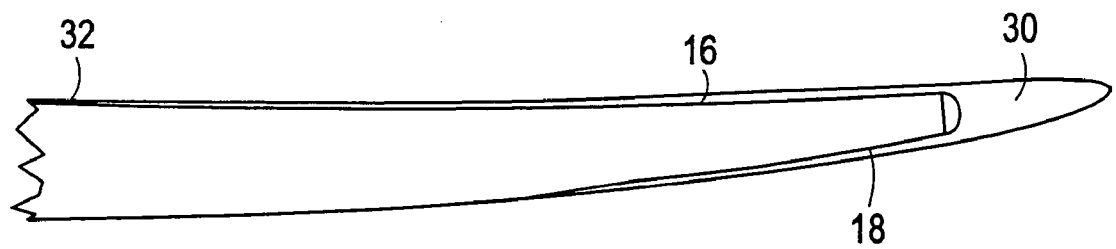
FIG. 11 is a cross-sectional view a leading edge of a fan blade in another embodiment of the invention.

FIG. 11 is a cross-sectional view a leading edge 12 of a fan blade in another embodiment of the invention. As shown in FIG. 11 blade 10 includes a reinforcement 30 which is a metal guard secured to the leading edge. It understood that the reinforcement 30 may be positioned at one or more of the leading edge, trailing edge and tip and may be made from materials other than metal. In addition a coating 32 is shown on the first surface 16, but may be applied on one or both of the first surface 16 and second surface 18. Coating 32 may be an erosion protection coating, paint, etc.

In an exemplary embodiment, the same resin system is used for the fiber composite layer and the high elongation fiber composite strips. The resin microstructure may be tailored to produce higher fracture toughness at the joint between a high elongation fiber composite strip and a fiber composite layer. A high damping material may be used either as a resin or as an interlayer between fiber composite layers. Further, undulating or angled layer configurations may be used to augment damping.

The combination of high elongation fiber composite strips used in conjunction with fiber composite layers provides increased mechanical integrity. This hybridized material system increases the interlaminar fracture resistance relative to single material systems. The high elongation fiber composite strips are lightweight relative to metal leading edges which provides a reduced airfoil thickness resulting in better aerodynamic performance and improved foreign object damage resistance.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A fan blade comprising:
   a plurality of fiber composite layers; and
   a plurality of high elongation fiber composite strips joining one of said fiber composite layers at a joint, said high elongation fiber composite strips including a first high elongation fiber composite strip having fibers oriented in a first direction, a second high elongation fiber composite strip having fibers oriented in a second direction different than said first direction, and a third high elongation fiber composite strip having fibers oriented in a third direction different than said first direction and said second direction.

2. The fan blade of claim 1 wherein:
   the modulus of said high elongation fiber composite strips is from about 13,790 MPa to about 96,530 MPa.

3. The fan blade of claim 2 wherein:
   the modulus of said high elongation fiber composite strips is from about 41,370 MPa to about 62,055 MPa.

4. The fan blade of claim 1 wherein:
the tensile elongation of said high elongation fiber composite strips is at least about 1.75%.

5. The fan blade of claim 4 wherein:
the tensile elongation of said high elongation fiber composite strips is at least about 3%.

6. The fan blade of claim 1 wherein:
at least one of said high elongation fiber composite strips is embedded within an interior surface of said fan blade.

7. The fan blade of claim 1 wherein:
said high elongation fiber composite strips are layered from a first outside surface of said fan blade towards an interior of said fan blade.

8. The fan blade of claim 7 wherein:
ends of said high elongation fiber composite strips are staggered such that a length of each high elongation fiber composite strip decreases as position from said first outside surface increases.

9. The fan blade of claim 7 wherein:
said high elongation fiber composite strips are contiguously layered from a first outside surface of said fan blade towards an interior of said fan blade.

10. The fan blade of claim 7 wherein:
said high elongation fiber composite strips extend around a leading edge of said fan blade to a second outside surface of said fan blade, said high elongation fiber composite strips layered from said second outside surface of said fan blade towards said interior of said fan blade.

11. The fan blade of claim 1, wherein:
said first direction is 45 degrees relative to a spanwise direction of said fan blade.

12. The fan blade of claim 11 wherein:
said second direction is parallel to the spanwise direction of said fan blade.

13. The fan blade of claim 1, wherein:
said first direction is 45 degrees relative to a spanwise direction of said fan blade;
said second direction is parallel to said spanwise direction of said fan blade; and
said third direction is −45 degrees relative to said spanwise direction of said fan blade.

14. The fan blade of claim 1 wherein:
at least one of said high elongation fiber composite strips is positioned at a leading edge of said fan blade.

15. The fan blade of claim 1 wherein:
at least one of said high elongation fiber composite strips is positioned at a leading edge, trailing edge and tip of said fan blade.

16. The fan blade of claim 1, wherein a plurality of fiber composite layers are interposed between respective ones of the high elongation fiber composite strips, such that at least a plurality of the high elongation fiber composite strips are not contiguous.

17. The fan blade of claim 16, wherein at least some of the high elongation fiber composite strips have fibers oriented in a direction of about 45 degrees relative to the spanwise direction of the blade.

18. The fan blade of claim 1, wherein ends of said high elongation fiber composite strips are staggered such that:
a length of at least one of the high elongation fiber composite strips differs relative to the respective length of other ones of the high elongation fiber composite strips, and
the respective lengths of the high elongation fiber composite strips do not monotonically increase or monotonically decrease as position from said first outside surface increases.

19. The fan blade of claim 18, wherein:
said first direction is parallel to a spanwise direction of said fan blade,
said second direction is 45 degrees relative to the spanwise direction of said fan blade, and
said third direction is −45 degrees relative to said spanwise direction of said fan blade.

* * * * *